United States Patent
Moy et al.

(10) Patent No.: US 11,447,028 B2
(45) Date of Patent: Sep. 20, 2022

(54) CHARGER AUTHORIZED REMOVAL METHOD AND AUTHORIZED REMOVAL SYSTEM

(71) Applicant: Ford Global Technologies, LLC, Dearborn, MI (US)

(72) Inventors: Kin Wayne Moy, Warren, MI (US); Julie D'Annunzio, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 593 days.

(21) Appl. No.: 15/997,843

(22) Filed: Jun. 5, 2018

(65) Prior Publication Data
US 2019/0366851 A1    Dec. 5, 2019

(51) Int. Cl.
*B60L 11/18*    (2006.01)
*H02J 7/00*     (2006.01)
*B60L 53/65*    (2019.01)

(52) U.S. Cl.
CPC ............ *B60L 53/65* (2019.02); *H02J 7/0027* (2013.01); *H02J 7/00034* (2020.01)

(58) Field of Classification Search
CPC .. B60L 53/65; H02J 7/0027; H02J 2007/0096
USPC ........................................................ 320/109
See application file for complete search history.

(56) References Cited

U.S. PATENT DOCUMENTS

| | | | |
|---|---|---|---|
| 8,262,402 B2 | 9/2012 | Gaul et al. | |
| 8,712,648 B2 | 4/2014 | Charnesky | |
| 9,496,736 B1 * | 11/2016 | Johansson | H02J 7/0047 |
| 9,545,853 B1 | 1/2017 | Penilla et al. | |
| 9,579,987 B2 | 2/2017 | Penilla et al. | |
| 9,834,108 B2 | 12/2017 | Yuan | |
| 2010/0211643 A1 * | 8/2010 | Lowenthal | B60L 3/0069 709/206 |
| 2011/0106329 A1 * | 5/2011 | Donnelly | B60L 53/65 700/291 |

(Continued)

FOREIGN PATENT DOCUMENTS

| | | |
|---|---|---|
| DE | 102013208063 | 11/2014 |
| WO | 2015053163 | 4/2015 |

OTHER PUBLICATIONS

Edelstein, https://www.greencarreports.com/news/1098003_electric-car-do-not-unplug-notices-public-education-at-its-best; posted Apr. 27, 2015. (Year: 2015).*

(Continued)

*Primary Examiner* — Richard Isla
*Assistant Examiner* — Dung V Bui
(74) *Attorney, Agent, or Firm* — David B. Kelley; Carlson, Gaskey & Olds, P.C.

(57) ABSTRACT

An exemplary charger removal method includes, among other things, transmitting a request to remove a charger from an electrified vehicle. The request is routed based on encoded information within a charger request label of the electrified vehicle. An exemplary charger removal system includes, among other things, a charge port assembly of an electrified vehicle that can transition from a locked to an unlocked position with a charger in response to a command. The system further includes a charger request label on the electrified vehicle. The charger request label contains encoded information enabling a first user to initiate a transmission of a request for the command from a second user.

15 Claims, 4 Drawing Sheets

(56) References Cited

U.S. PATENT DOCUMENTS

| | | | | |
|---|---|---|---|---|
| 2011/0175569 A1* | 7/2011 | Austin | | B60L 53/38 |
| | | | | 320/109 |
| 2011/0277516 A1* | 11/2011 | Kahara | | B60L 53/16 |
| | | | | 70/58 |
| 2011/0287649 A1* | 11/2011 | Kurumizawa | | B60L 53/68 |
| | | | | 439/304 |
| 2011/0300733 A1 | 12/2011 | Janarthanam et al. | | |
| 2012/0232761 A1* | 9/2012 | Charnesky | | B60L 53/16 |
| | | | | 701/49 |
| 2013/0015951 A1* | 1/2013 | Kuramochi | | H01R 13/6397 |
| | | | | 340/5.64 |
| 2014/0167915 A1* | 6/2014 | Tamada | | B60L 50/16 |
| | | | | 340/5.61 |
| 2014/0179141 A1* | 6/2014 | Kojima | | B60L 50/16 |
| | | | | 439/296 |
| 2014/0203077 A1* | 7/2014 | Gadh | | H02J 13/00012 |
| | | | | 235/382 |
| 2014/0214516 A1* | 7/2014 | Genschel | | B60L 53/665 |
| | | | | 705/14.27 |
| 2015/0061594 A1* | 3/2015 | Hockenstrom | | B60L 53/22 |
| | | | | 320/109 |
| 2015/0149221 A1* | 5/2015 | Tremblay | | G06Q 10/02 |
| | | | | 705/5 |
| 2016/0012657 A1* | 1/2016 | Reineccius | | G06Q 20/22 |
| | | | | 705/39 |
| 2016/0027042 A1* | 1/2016 | Heeter | | G06Q 30/0248 |
| | | | | 705/14.47 |
| 2016/0129800 A1* | 5/2016 | Mauter | | B60L 50/72 |
| | | | | 320/109 |
| 2016/0229305 A1* | 8/2016 | Shumaker | | G06F 21/31 |
| 2017/0217403 A1* | 8/2017 | Kim | | B60R 25/24 |
| 2017/0246962 A1 | 8/2017 | Weber et al. | | |

OTHER PUBLICATIONS

Stephen Edelstein, http://www.greencarreports.com (hhttps://www.greencarreports.eom/news/1098003_electric-car-do-not-unplug-notices-public-education-at-its-best; posted Apr. 27, 2015 (Year: 2015).*

Stephen Edelstein, https://www.greencarreports.com/news/1098003_electric-car-do-not-unplug-notices-public-education-at-its-best; posted Apr. 27, 2015 (Year: 2015).*

* cited by examiner

CHARGER AUTHORIZED REMOVAL METHOD AND AUTHORIZED REMOVAL SYSTEM

TECHNICAL FIELD

This disclosure relates generally to requesting and authorizing a removal of a charger from a charge port of an electrified vehicle. The removal is so that another electrified vehicle can utilize the charger.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction batteries of some electrified vehicles can be charged from an external power source, such as a grid power source provided through a charging station. During a charge of the traction battery from the charging station, a charger of the charging station can be electrically coupled to a charge port of the electrified vehicle. Some chargers can be locked into an electrically coupled position with the charge port, which prevents another electrified vehicle from utilizing the charger for a charge.

SUMMARY

A charger removal method according to an exemplary aspect of the present disclosure includes, among other things, transmitting a request to remove a charger from an electrified vehicle. The request is routed based on encoded information within a charger request label of the electrified vehicle.

Another exemplary non-limiting embodiment of the foregoing method includes scanning the charger request label to collect the encoded information.

In another exemplary non-limiting embodiment of any of the foregoing methods, the transmitting is initiated by a first user desiring to use the charger. The request is routed to a second user that can unlock the charger from the electrified vehicle from a position that is remote from the electrified vehicle.

In another exemplary non-limiting embodiment of any of the foregoing methods, the transmitting is initiated by a first user desiring to use the charger. The request is routed to a second user without revealing an identity of the second user to the first user.

In another exemplary non-limiting embodiment of any of the foregoing methods, the transmitting is initiated by the first user from a user device.

Another non-limiting exemplary embodiment of any of the foregoing methods includes, in response to the request, receiving a command initiated by the second user that causes the charger to unlock from the charge port.

In another exemplary non-limiting embodiment of any of the foregoing methods, the charger request label is a barcode.

In another exemplary non-limiting embodiment of any of the foregoing methods, the charger request label is positioned on, or directly adjacent to, a charge port of the electrified vehicle.

Another exemplary non-limiting embodiment of any of the foregoing methods includes transmitting the request from a first user client device to a server that is configured to transmit the request to a second user client device.

Another exemplary non-limiting embodiment of any of the foregoing methods includes, in response to the request sent to the second user client device, receiving a message on the first user client device indicating that the charger is unlocked or will be unlocked after a set time.

In another exemplary non-limiting embodiment of any of the foregoing methods, the request to remove comprises a request to unlock the charger from the electrified vehicle.

A charger removal system according to another exemplary non-limiting embodiment of this disclosure includes, among other things, a charge port assembly of an electrified vehicle that can transition from a locked to an unlocked position with a charger in response to a command. The system further includes a charger request label on the electrified vehicle. The charger request label contains encoded information enabling a first user to initiate a transmission of a request for the command from a second user.

In another exemplary non-limiting embodiment of the foregoing system, the encoded information of the charger request label is a barcode.

In another exemplary non-limiting embodiment of any of the foregoing system, the encoded information of charger request label is a Quick Response code.

In another exemplary non-limiting embodiment of any of the foregoing systems, the charger request label is positioned on, or directly adjacent to, a charge port of the electrified vehicle.

In another exemplary non-limiting embodiment of any of the foregoing systems, the charger request label is positioned on an inside surface of a charge port door.

In another exemplary non-limiting embodiment of any of the foregoing systems, the charger request label does not reveal personal information about the second user to a first user viewing the charger request label such that the second user remain anonymous to the first user when receiving a request to unlock the charger from the first user, and when sending the command.

A charger removal system according to another exemplary aspect of any of the foregoing systems includes a first user client device that scans the encoded information on the charger request label and initiates the routing of the request to a server.

A charger removal system according to another exemplary embodiment of any of the foregoing systems includes a second user client device that receives the request from the server.

In another non-limiting embodiment of any of the foregoing systems, the first user client device and the second user client device are both handheld devices. The second user client device is configured to authorize the command in response to the request. The server sends the command to a vehicle client device to cause the charge port to transition from the locked to the unlocked position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to requesting authorization to remove a charger be removed from a charge port of an electrified vehicle. The request can be sent by a first user that desires to use the charger. The request can be sent to a second user that can authorize the request and, potentially, initiate an unlocking of the charger. The request can be made without revealing the identity of the second user to the first user.

Figure 1:
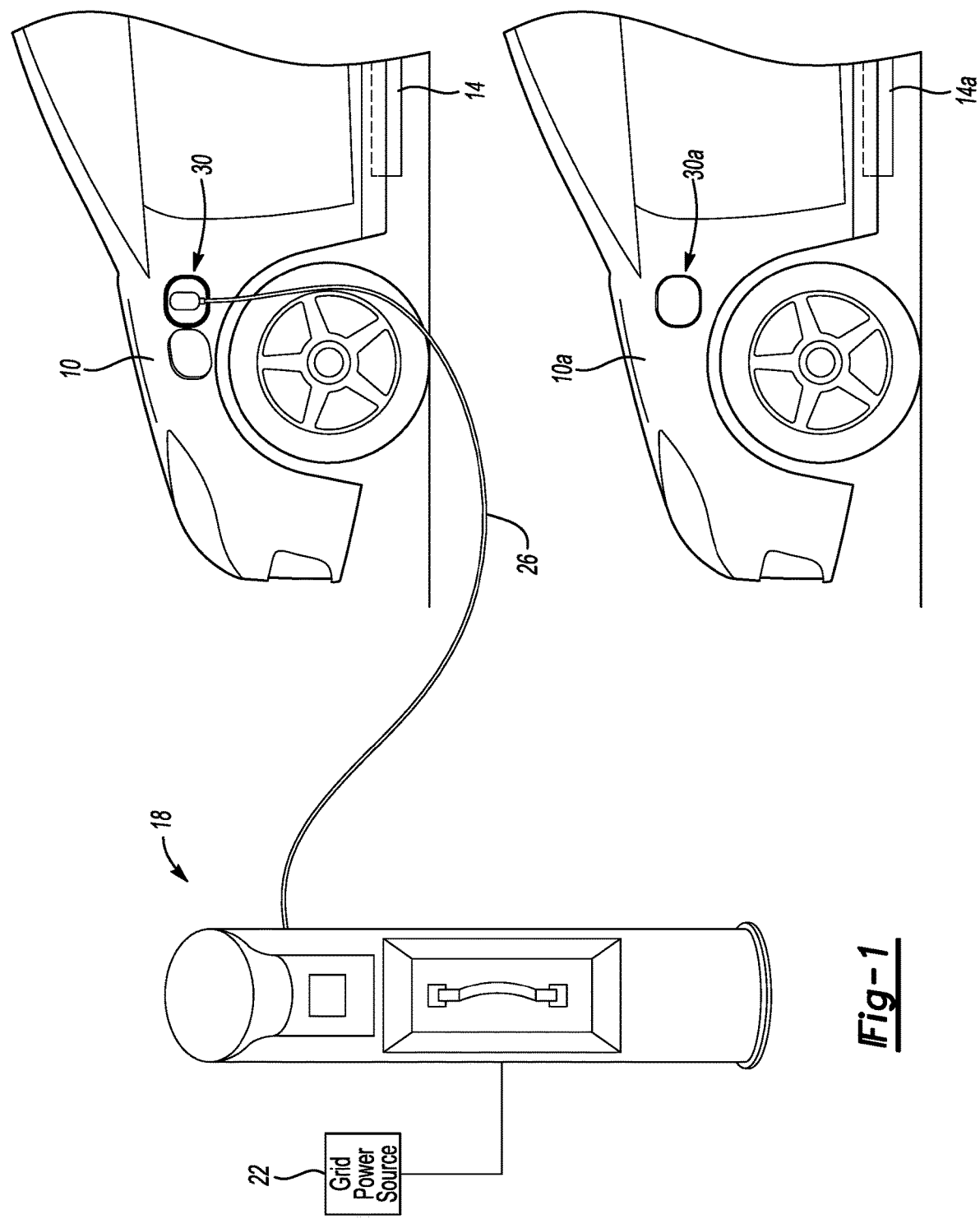
FIG. 1 illustrates a portion of an electrified vehicle electrically coupled to a charging station via a charger, and a portion of another electrified vehicle that is not electrically coupled to the charging station.

Referring to FIG. 1, an electrified vehicle 10 includes a traction battery 14. A charging station 18 is shown charging the traction battery 14.

When charging, the charging station 18 passes power from a grid power source 22 through a charger 26 to the first electrified vehicle 10. The charger 26 engages a charge port assembly 30 of the electrified vehicle 10 to electrically couple the charging station 18 to the electrified vehicle 10.

The charge port assembly 30 includes a lock 32 that can lock the charger 26 into a position where the charger 26 is electrically coupled with the charge port assembly 30. The lock 32 can prevent an unauthorized user from removing the charger 26 from the charge port assembly 30. The lock 32 can move back and forth between a locked position and an unlocked position in response to a command. A person having skill in this art and the benefit of this disclosure would understand a lock suitable for selectively locking the charger 26 into a locked position relative to the charge port assembly 30.

In this exemplary non-limiting embodiment, the charger 26 is locked into an electrically coupled position with the charge port assembly 30. Also, the electrified vehicle 10 is unattended.

In this example, the charging station 18 is a shared charging station. Shopping centers, parking structures, workplaces, condominium complexes, etc. often include shared charging stations. Adjacent parking spaces near shared charging stations enable more than one electrified vehicle to park nearby. The charger can be moved between the parked electrified vehicles as required, provided the charger of the charging station is unlocked.

FIG. 1 also shows another electrified vehicle 10a adjacent the charging station 18. A first user can desire to charge a traction battery 14a of the electrified vehicle 10a utilizing the charging station 18. However, as long as the charger 26 remains locked to the charge port assembly 30 of the electrified vehicle 10, the first user is unable to charge the traction battery 14a. In other words, the first user cannot begin a charge of the electrified vehicle 10a unless the charger 26 is unlocked from the electrified vehicle 10.

In the exemplary embodiment, the first user does not know the identity of a second user associated with electrified vehicle 10.

Figure 2:
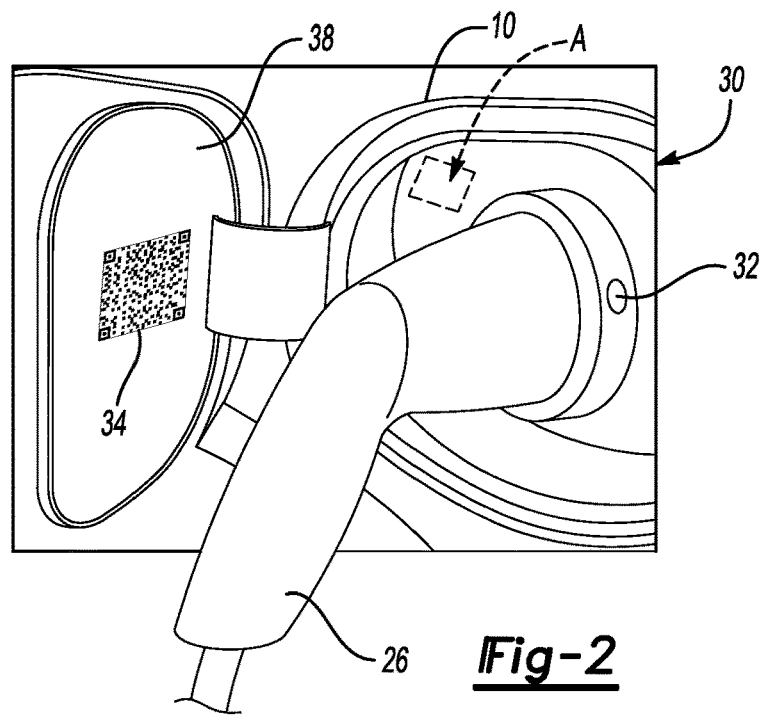
FIG. 2 shows a close-up view of a charge port of the electrified vehicle from FIG. 1 that is electrically coupled to the charging station.
Figure 3:
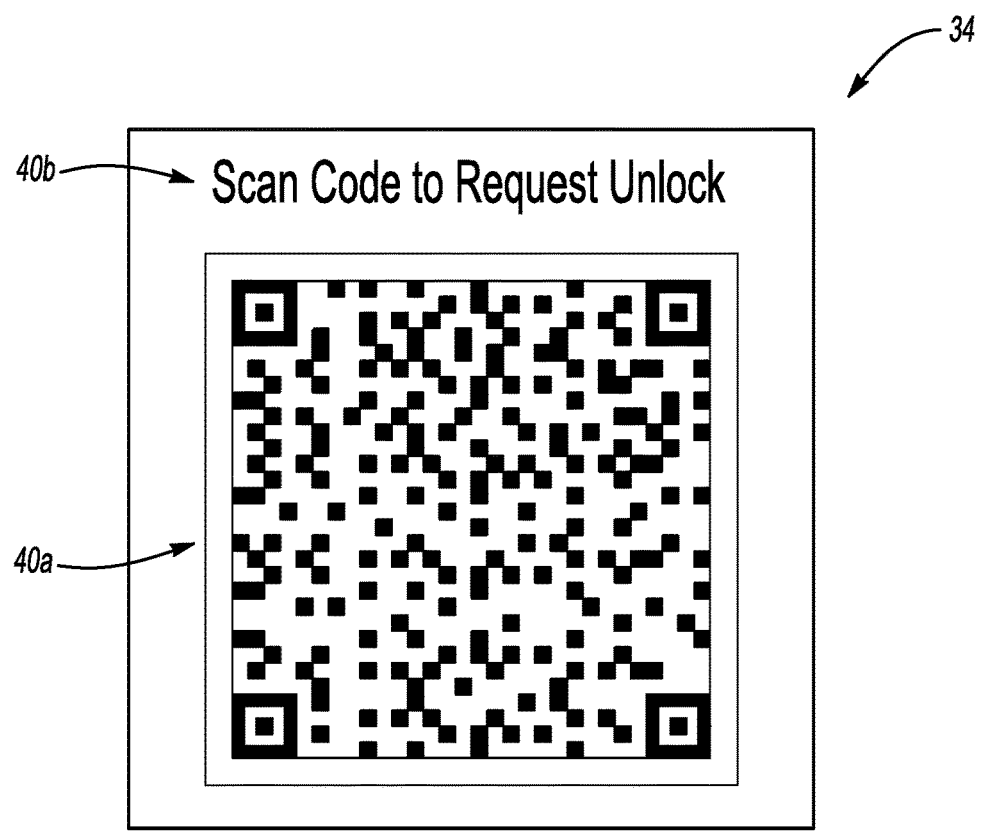
FIG. 3 shows a close-up view of a charger request label associated with the charge port of FIG. 2.

With reference now to FIGS. 2 and 3 and continued reference to FIG. 1, the electrified vehicle 10 includes a charger request label 34. In this example, the charger request label 34 is affixed to an inside surface of a charge port cover 38, such as on a flat surface molded into the charge part cover 38. In another example, the charger request label 34 is molded into the charge port cover 38. In another example, the charger request label 34 could be positioned in an area A adjacent to where the charger 26 engages the charge port assembly 30, but off of the charge port cover 38. This placement could be appropriate if the electrified vehicle 10 does not include a charge port cover 38.

The exemplary charger request label 34 includes encoded information 40a, and a text-based information 40b. In this example, the encoded information 40a is a Quick Response (QR) code. Although described as a QR code, the encoded information 40a could have other configurations, such as another type of matrix barcode, or another type of barcode.

The text-based information of the exemplary charge request label 34 states "SCAN CODE TO REQUEST UNLOCK." The text-based information 40b on the charger request label 34 indicates to the first user of the electrified vehicle 10A that the first user should scan the encoded information 40a to request an unlock of the charger 26.

Figure 4:
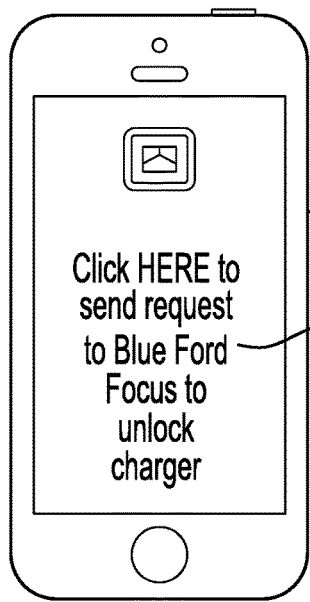
FIG. 4 illustrates a first user client device displaying a message prompting a first user to send a request to unlock of the charger from the electrified vehicle of FIG. 2.
Figure 5:
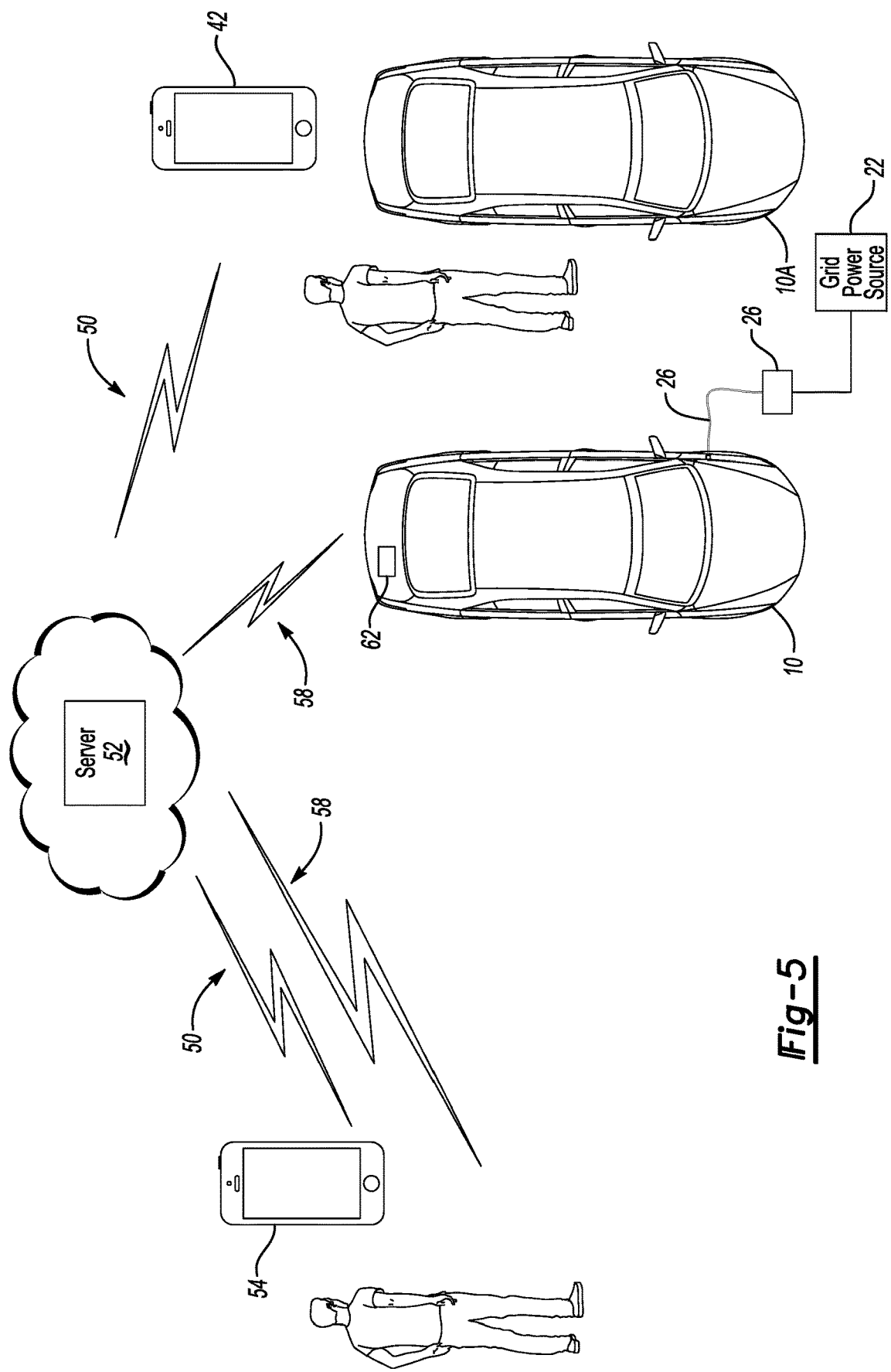
FIG. 5 shows a schematic view of a charger removal system according to an exemplary aspect of the present disclosure, along with other components.

With reference now to FIGS. 4 and 5 and continued reference to FIGS. 1 and 2, the first user of the electrified vehicle 10a can scan the charger request label 34 with a client device 42, here a smartphone. Although described as a smartphone, the client device 42 could be another type of device, such as another handheld devices, a wearable device, etc.

After scanning the charger request label 34, the client device 42 displays a message 46 prompting the first user of the electrified vehicle 10a to initiate a request to unlock the charger 26 from the charge port assembly 30 of the electrified vehicle 10.

In this exemplary non-limiting embodiment, the client device 42 sends the request 50 as a wireless request to a server 52, which then relays the request 50 to a client device 54 accessible by the second user of the electrified vehicle 10. In response to the request 50, the client device 54 displays a message to the second user indicating that the first user is requesting an unlock of the charger 26 from the charge port assembly 30 of the electrified vehicle 10.

In response to the request, the second user can interacts with the client device 54 and send a response 58 back to the server 52, which is then relayed to an electrified vehicle client device 62 within the electrified vehicle 10. The server 52 could be cloud-based, or at least partially cloud-based.

The response 58 sent to the electrified vehicle client device 62 can initiate an unlock of the charger 26 from the electrified vehicle 10. For example, the receipt of the response 58 could cause a controller of the electrified vehicle 10 to command the lock 32 to transition to an unlocked position.

The controller can be a controller module of the electrified vehicle 10. The controller module could include a processor and a memory portion. The controller module can be a stand-alone controller or incorporated into a controller module such as a Battery Electronic Control Module (BECM). The controller module could include multiple controller modules in the form of multiple hardware devices, or multiple software controllers within one or more hardware devices. At least some portions of the controller module could, in some examples, be located remote from the vehicle.

The processor can be programmed to execute a program stored in the memory portion. The processor can be a custom made or commercially available processor, a central processing unit (CPU), an auxiliary processor among several processors associated with the controller module, a semiconductor based microprocessor (in the form of a microchip or chip set) or generally any device for executing software instructions.

The memory portion can include any one or combination of volatile memory elements. The program can be stored in the memory portion as software code. The can include one or more additional or separate programs, each of which includes an ordered listing of executable instructions for implementing logical functions associated with controlling the lock 32 in response to commands within the response 58.

After the charger 26 is unlocked, the first user can remove the charger 26 from the charge port assembly 30 of the electrified vehicle 10, and engage the charger 26 with a charge port assembly 30 of the electrified vehicle 10*a* to begin a charge of the traction battery 14*a*.

Notably, the charger request label 34 does not reveal personal information, such as identification information of the second user, to the first user. Instead, the request 50 and the response 58 are conveyed anonymously between the first and the second user.

Figure 6:
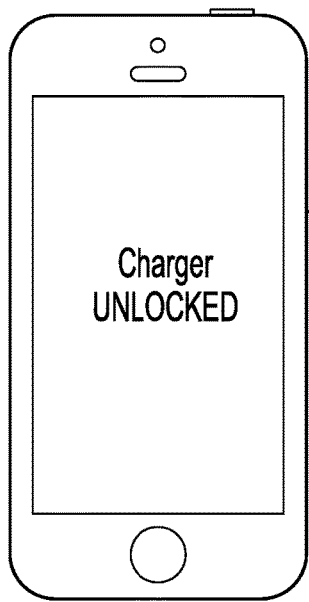
FIG. 6 illustrates the first user client device of FIG. 5 displaying a first type of message sent in response to the request of FIG. 4.

In some examples, the response from the second user could include a portion transmitted to the client device 42. The portion may cause the client device 42 to reveal a message as shown in FIG. 6 indicating to the first user that the second user has agreed to unlock the charger 26, and that the charger 26 is unlocked.

In some examples, the second user may receive the request 50 from the first user to unlock the charger 26, but still desire to keep the charger 26 in a locked position with the charge port assembly 30 of the electrified vehicle 10. The second user could desire to, for example, keep the charger 26 coupled to the charge port assembly 30 if the second user needs additional charging of the traction battery 14.

Figure 7:
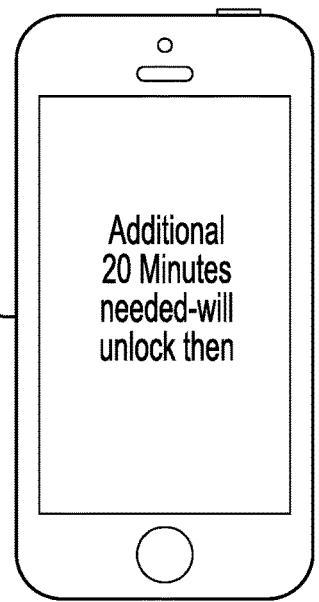
FIG. 7 illustrates the first user client device of FIG. 5 displaying a second type of message sent in response to the request of FIG. 4.

In such situations, the response 58 could delay the unlocking of the charger 26 for a set time. The charger 26 could be commanded to unlock after for example, a 20 minute delay. The response 58 could include a portion transmitted to the client device 42 that prompts a message on the client device 42, as shown in FIG. 7, indicating that the charger 26 will unlock after a delay.

In some examples, the second user could adjust the delay via the user device 54. For example, the second user could lengthen the delay if more charging of the traction battery 14 is required, or lessen the delay if the traction battery 14 is approaching a desired state of charge.

In some examples, the second user and, optionally, the first user can both be members of a closed group of electrified vehicle users that choose to include unlock request labels on their associated electrified vehicles. Additional users could be added to the closed group by signing up online to request an unlock request label that is specific to their electrified vehicle and contains information suitable for locating the user for responses to queries for charger unlocks.

The members of the closed group could be controlled and monitored through the Internet. An Internet website, for example, could provide a forum for users of electric vehicle to communicate their willingness to participate in the charger removal methods of this disclosure without sharing personal information such as their name, email address, telephone number, etc., to other users. The closed group could be associated with employees at a particular business, residents of a particular condominium complex, etc.

After registering on the secured website, the user can be sent a charger request label that includes encoded information specific to that user. The presence of the label on the user's electrified vehicle then notifies others of the user's participation in the closed group.

Figure 8:
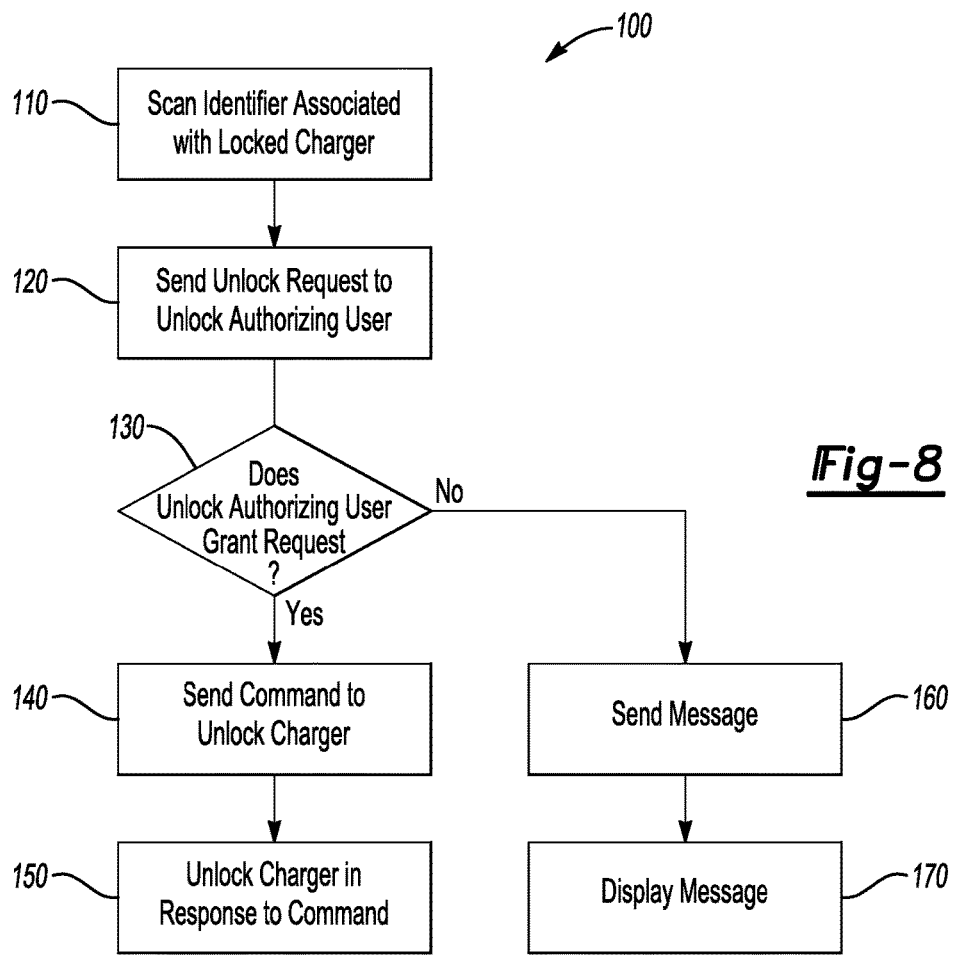
FIG. 8 illustrates the flow of an example charger removal method.

With reference now to FIG. 8, a charger authorizing method 100 in an exemplary embodiment is a method of requesting an unlocking of a charger. The method 100 begins at step 110 where a charger request label associated with a locked charger is scanned by, for example, an unlock requesting user. After scanning, the method 100 moves to a step 120 where an unlock request is sent to an unlock authorizing user. The method 100 then moves to a step 130 where the unlock authorizing user decides whether or not to grant the request.

If the unlock authorizing user grants the request, the method 100 moves to a step 140 where a command to unlock the charger is transmitted to the electrified vehicle having the locked charger. The electrified vehicle having the locked charger then unlocks the charger at a step 150.

If, at the step 130, the unlock authorizing user instead decides not to unlock the charger, the method 100 moves to a step 160 where a message is sent to the unlock requesting user, or a device associated with the unlock requesting user. At a step 170, the device associated with the unlock requesting user displays the message, which could indicate that the unlock authorizing user has elected not to unlock the charger, or that the charger would be, for example, unlocked after some delay.

The unlock authorizing user can decide whether or not to grant the request after reviewing the state of charge for their electrified vehicle. The unlock authorizing user could use an electrified vehicle monitoring app on a user device to obtain this information.

Features of some of the examples in this disclosure include a charger removal method and system that enable a first user of a first electrified vehicle to contact a second user associated with a second electrified vehicle having a locked charger. The communicating occurs without requiring the second user to reveal or share identification information, or other personal information, with the first user. From a remote location, the second user can choose to unlock the charger, or to keep the charger locked, without ever personally interacting with the first user.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A charger removal method, comprising:
   transmitting a request to remove a charger from a charge port assembly of an electrified vehicle, the request routed based on encoded information within a charger request label of the electrified vehicle;

scanning the charger request label to collect the encoded information; and transmitting the request from a first user client device to a server that is configured to transmit the request to a second user client device, wherein the first user client device and the second user client device are both handheld devices, wherein the second user client device is configured to authorize a command in response to the request to a vehicle client device to cause the charge port assembly to transition from a locked to an unlocked position.

2. The charger removal method of claim 1, wherein the transmitting is initiated by a first user desiring to use the charger, and the request is routed to a second user that can unlock the charger from the electrified vehicle from a position that is remote from the electrified vehicle.

3. The charger removal method of claim 1, wherein the transmitting is initiated by a first user desiring to use the charger, and the request is routed to a second user without revealing an identity of the second user to the first user.

4. The charger removal method of claim 3, wherein the transmitting is initiated by the first user from a user device.

5. The charger removal method of claim 3, further comprising, in response to the request, receiving a command initiated by the second user that causes the charger to unlock from a charge port.

6. The charger removal method of claim 1, wherein the charger request label is a barcode.

7. The charger removal method of claim 1, wherein the charger request label is positioned on or directly adjacent to a charge port of the electrified vehicle.

8. The charger removal method of claim 1, further comprising, in response to the request sent to the second user client device, receiving a message on the first user client device indicating that the charger is unlocked or will be unlocked after a set time.

9. A charger removal system, comprising:

a charge port assembly of an electrified vehicle that can transition from a locked to an unlocked position with a charger in response to a command; and a charger request label on the electrified vehicle, the charger request label containing encoded information enabling a first user to initiate a transmission of a request for the command from a second user, wherein the encoded information of the charger request label is configured to be scanned by the first user, a first user client device that scans the encoded information on the charger request label and initiates a routing of the request to a server; and a second user client device that receives the request from the server, wherein the first user client device and the second user client device are both handheld devices, wherein the second user client device is configured to authorize the command in response to the request, the server sending the command to a vehicle client device to cause the charge port assembly to transition from the locked to the unlocked position.

10. The charger removal system of claim 9, wherein the encoded information of charger request label is a barcode.

11. The charger removal system of claim 10, wherein the encoded information of charger request label is a Quick Response code.

12. The charger removal system of claim 9, wherein the charger request label is positioned on or directly adjacent to a charge port of the electrified vehicle.

13. The charger removal system of claim 12, wherein the charger request label is positioned on an inside surface of a charge port door.

14. The charger removal system of claim 9, wherein the charger request label does not reveal personal information about the second user to a first user such that the second user can remain anonymous to the first user when receiving the request to unlock the charger from the first user, and when sending the command.

15. A charger removal method, comprising:

transmitting a request to remove a charger from an electrified vehicle, the request routed based on encoded information within a charger request label of the electrified vehicle, the encoded information obtained by scanning the charger request label, wherein the transmitting is initiated by a first user desiring to use the charger, wherein the request is routed to a second user that can unlock the charger from the electrified vehicle from a position that is remote from the electrified vehicle, wherein the request is routed to the second user without revealing an identity of the second user to the first user;

transmitting the request from a first user client device to a server that is configured to transmit the request to a second user client device in response to the request; and receiving a command initiated by the second user that causes the charger to unlock from a charge port, wherein the charger request label is positioned on or directly adjacent to a charge port of the electrified vehicle.

* * * * *